United States Patent
Boyce

(10) Patent No.: US 6,542,693 B2
(45) Date of Patent: Apr. 1, 2003

(54) DIGITAL VIDEO PLAYBACK WITH TRICK PLAY FEATURES

(75) Inventor: Jill MacDonald Boyce, Manalapan, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/087,068

(22) Filed: May 29, 1998

(65) Prior Publication Data

US 2001/0053276 A1 Dec. 20, 2001

(51) Int. Cl.$^7$ .................................................. H04N 5/91
(52) U.S. Cl. .......................................... 386/68; 386/111
(58) Field of Search .............................. 386/46, 68, 80, 386/81, 111, 112, 109; 348/7; 709/219

(56) References Cited

U.S. PATENT DOCUMENTS

| | | | |
|---|---|---|---|
| 5,852,706 A | * 12/1998 | Ogikubo et al. | ............. 386/111 |
| 5,887,110 A | * 3/1999 | Sakamoto et al. | ............. 386/68 |
| 5,974,224 A | * 10/1999 | Nagata | ......................... 386/109 |
| 6,012,091 A | * 1/2000 | Boyce | ........................... 348/7 |
| 6,078,721 A | * 6/2000 | Uchimi et al. | ................. 386/68 |

* cited by examiner

Primary Examiner—Huy Nguyen
(74) Attorney, Agent, or Firm—Eugene J. Rosenthal

(57) ABSTRACT

Reverse jog play can be provided quickly and simply in a player that plays a recorded stream of inter-frame encoded digital video by storing, in intra-coded frame format, frames that were previously decoded by the player and are in the vicinity of the frame currently being displayed. The intra-frame encoded versions of the decoded frames may be digitally stored in random access memory (RAM) or in some other storage medium that is easily accessible. The number of previously decoded frames may be a fixed number essentially independent of the frame structure of the video stream. Alternatively, the player stores each decoded frame from a predetermined, e.g., the most recently or next to most recently decoded, intra-coded frame (I-frame) until the current frame. Thus, the number of useable stored frames is a function of the video stream structure, the design choices of the user, and the current frame being displayed. Optionally, when using reverse jog play, an additional series of frames is decoded and stored upon reaching a point near the I-frame toward which the display is moving. Advantageously, by using I-frame format for storing the previously decoded frames for possible use in reverse jog play, the storage requirement for such frames is reduced while conventional available components may be used to implement the system.

35 Claims, 1 Drawing Sheet

DIGITAL VIDEO PLAYBACK WITH TRICK PLAY FEATURES

TECHNICAL FIELD

This invention relates to the art of digital video players, such as video tape recorders, digital video disks (DVD), and the like, and more particularly, to digital video players that provide so-called trick play features when the video information to be played is digitally encoded using inter-frame encoding.

BACKGROUND OF THE INVENTION

Reverse jog play is a feature of video players in which the video player plays the video in a manner that displays consecutive single frames of video in reverse order. When the video information to be played by the player is a digital signal, such as is played by digital video tape recorders or digital video disk (DVD) players, often the digital signal was developed by using an inter-frame encoding system, such as MPEG 1, MPEG 2, or H.263.

A result of using such inter-frame encoding is that there is a problem in the art of digital video players with respect to reverse jog play, namely, that to achieve reverse jog play it is necessary to decode all the frames of the video signal from a base frame, which is typically intra-frame encoded, up until the frame to be currently displayed using reverse jog play. The necessity to do this decoding adds substantially to the delay before the first frame can be displayed after initiation of reverse jog play, and a similar delay is encountered for each of the subsequent frames displayed in reverse jog play. Also, while performing this decoding for reverse jog play it is necessary to suppress the display of each of the frames that are decoded from the base frame until reaching the frame that is to be currently displayed, thus adding complexity to the decoder.

The prior art reverse-jog-play problem is especially acute for video tape recorders because they lack the ability to randomly access the video frames. As a result, the tape must first be searched to accurately locate the base frame. Thereafter, the tape must be constantly rewound to the base frame and advanced through the intervening frames up to the frame to be displayed.

One prior art system for performing reverse jog play is encode the entire video sequence in reverse order in addition to, and associated with, a stored version of the video sequence in the forward order. When reverse jog play is required, forward jog play is invoked but using the reversed video sequence. However, disadvantageously, this technique doubles the storage requirement for the video signal and it may also increase the hardware required for playing the video signal.

SUMMARY OF THE INVENTION

I have recognized that reverse jog play can be provided quickly and simply in a player that plays a recorded stream of inter-frame encoded digital video by storing, in intra-coded frame format, frames that were previously decoded by the player and are in the vicinity of the frame currently being displayed. The intra-frame encoded versions of the decoded frames may be digitally stored in random access memory (RAM) or in some other storage medium that is easily accessible.

In accordance with one aspect of the invention, the number of previously decoded frames which are stored is selected at the discretion of the implementor, e.g., 30 frames, the number being essentially independent of the frame structure of the video stream. In accordance with another embodiment of the invention, the player stores each decoded frame from a predetermined, e.g., the most recently or next to most recently decoded, intra-coded frame (I-frame) until the current frame. Thus, the number of useable stored frames is a function of the video stream structure, the design choices of the user, and the current frame being displayed. Optionally, when using reverse jog play, an additional series of frames is decoded and stored upon reaching a point near the I-frame toward which the display is moving.

Advantageously, by using I-frame format for storing the previously decoded frames for possible use in reverse jog play, the storage requirement for such frames is reduced while conventional available components may be used to implement the system.

DETAILED DESCRIPTION

Reverse jog play can be provided quickly and simply in a player that plays a recorded stream of inter-frame encoded digital video by storing, in intra-coded frame format, frames that were previously decoded by the player and are in the vicinity of the frame currently being displayed. The intra-frame encoded versions of the decoded frames may be digitally stored in random access memory (RAM) or in some other storage medium that is easily accessible, for which the following merely illustrates the principles of the inventions. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intend intended to encompass both structural and functional equivalents thereof. Additionally, it is intended that such equivalents include both currently known equivalents as well as equivalents developed in the future that performs the same function, regardless of structure.

Figure 1:
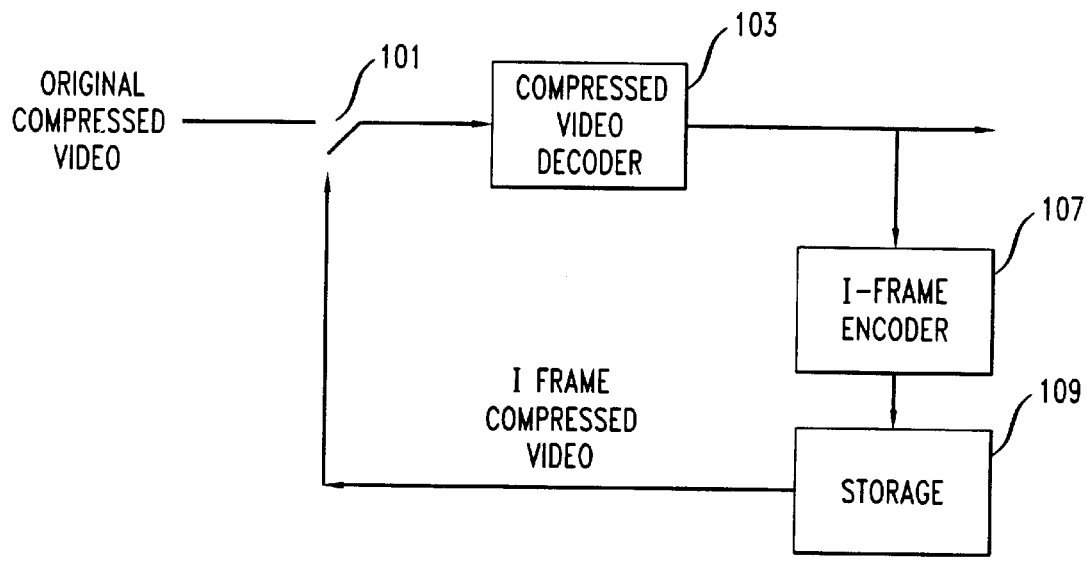
FIG. 1 shows a representation of a portion of the video reconstruction section of an exemplary video player according to one embodiment of the invention.

FIG. 1 shows a representation of a portion of the video reconstruction section of an exemplary digital video player according to one embodiment of the invention. Shown in FIG. 1 are a) switch 101; b) compressed video stream, e.g., MPEG, decoder 103; c) intra-frame (I-frame) encoder 107; and d) storage 109.

Switch 101 selects the input to be supplied to MPEG decoder 103. In a first position of switch 101 the input supplied to compressed video decoder 103 is the compressed video bitstream that is received from the section (not shown)

of the video player responsible for retrieving the compressed video bitstream from a media, e.g., tape, disk, or other location. In a second position of switch 101 the input supplied to compressed video decoder 103 is the compressed video frames which are stored in storage 109 in intra-frame encoded format. The position of switch 101 is controlled by an overall system controller (not shown) in response to a user request for regular playback or jog playback.

Of course, for other features not of interest to the invention, there may be additional positions for switch 101. Note that, switch 101 may be implemented in any conventional manner, e.g., semiconductor, relay, or the like. Compressed video decoder 103 is any conventional digital video decoder, e.g., an MPEG 1, an MPEG 2 or an H.263 decoder. It receives as an input a bitstream from switch 101 which contains compressed video. Compressed video decoder 103 decodes the compressed video stream in the conventional manner to develop decompressed video frames, which are supplied as an output. The decompressed video frames are supplied both 1) for further processing to develop the signal which is ultimately displayed on a viewer's display and 2) to I-frame encoder 107.

In accordance with the principles of the invention, I-frame encoder 107 performs intra-frame encoding on the decompressed video frames that it receives from compressed video decoder 103. This results in a new bit stream where each frame which was originally part of the compressed video bitstream supplied via switch 101 to compressed video decoder 103 is now represented as an I-frame regardless of whether the frame was originally represented as an I-frame or was originally represented as an inter-frame encoded frame (B- or P-frames). Note that the I-frames supplied by I-frame encoder 107 have the same format as I-frames in the original compressed video. Advantageously, for use with MPEG, compressed video decoders and I-frame encoders—which may be implemented in software or by a reduced functionality version of a full MPEG encoder—are readily available at relatively low cost.

The I-frame encoded versions of each frame are supplied by I-frame encoder 107 to storage 109. Storage 109 stores the frames in a circular manner. More particularly, since the I-frames are of variable size, after storage 109 is initially filled a new frame overwrites as much space as is necessary to store the frame, starting with the oldest frame and proceeding toward the newer ones until the new frame is completely stored. The capacity of storage 109 is determined by the implementor. For one implementation it is recommended that storage 109 be sufficient to accommodate 30 average frames of video. Storage 109 may be implemented by a dual ported memory.

In accordance with the principles of the invention, when reverse jog play is selected by a viewer, storage 109 supplies the stored I-frames, in accordance with the viewer's selection of the frame, to compressed video decoder 103 via switch 101. Note that compressed video decoder 103 understands how to decode properly formatted I-frames independent of any other frames in a video stream. Since the frames supplied by storage 109 are such properly formatted I-frames, compressed video decoder 103 decodes the I-frames supplied by storage 109 and supplies the resulting decompressed video frames as an output for further processing to develop the signal which is ultimately displayed on a viewer's display.

The decompressed video frames may also be reencoded by I-frame encoder 107 and stored again in storage 109. Alternatively, that process may be disabled so long as video player is operating in reverse jog play using frames already stored in storage 109.

To avoid concatenated encoding, and so improve quality somewhat, I-frames of the original compressed video bitstream need not be reencoded by I-frame encoder 107. Instead such I-frames, can be shunted through, or around, I-frame encoder 107. Thus they pass directly from the output of switch 101, or the input of compressed video decoder 103, to storage 109 via an optional bypass path.

Figure 2:
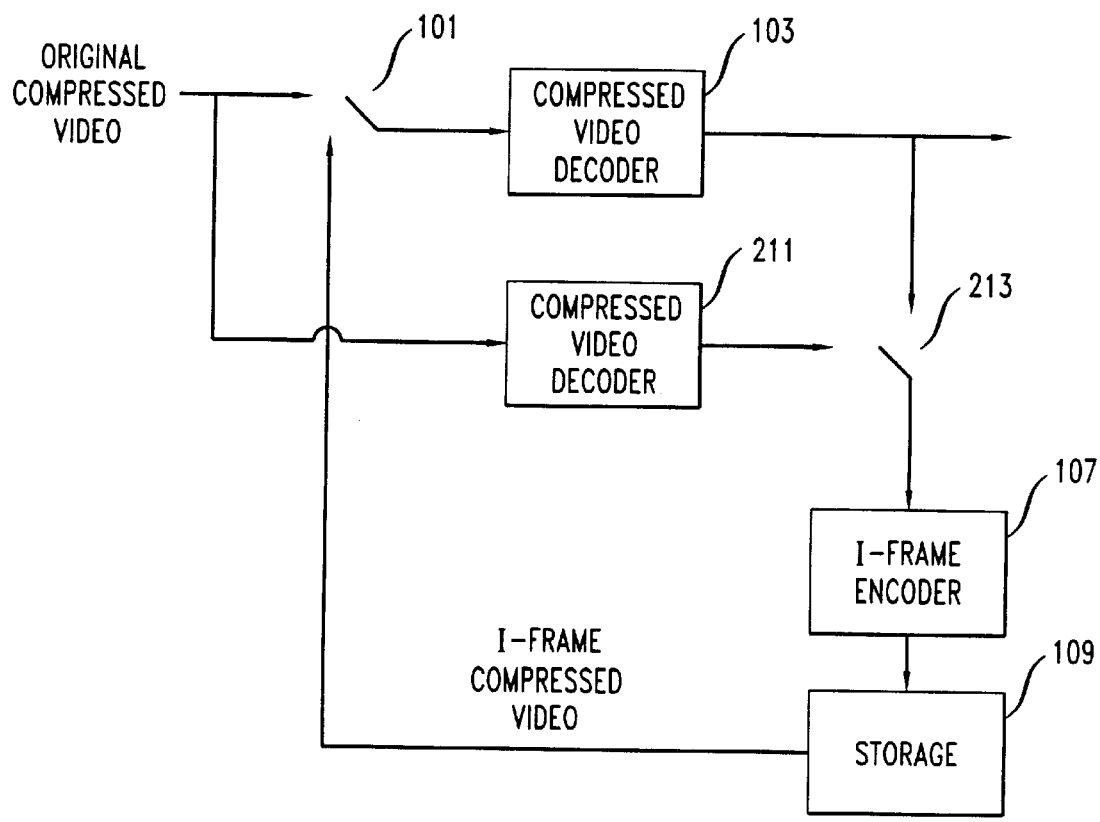
FIG. 2 shows a representation of a portion of the video reconstruction section of an exemplary video player according to another embodiment of the invention.

FIG. 2 shows a representation of a portion of the video reconstruction section of an exemplary video player according to another embodiment of the invention. Shown in FIG. 2 are a) switch 101; b) compressed video stream, e.g., MPEG, decoder 103; c) intra-frame (I-frame) encoder 107; d) storage 109; e) compressed video stream, e.g., MPEG, decoder 211; and f) switch 213. Any element of FIG. 2 that has the same name and reference numeral as an element of FIG. 1 operates in accordance with the description of that element given in connection with FIG. 1.

With switch 213 connected to compressed video decoder 103, the section of the video player shown in FIG. 2 operates the same as the section of the video player shown in FIG. 1. However, once the video player is operated in reverse jog play for a period of time so that there are only left in storage 109 a certain number of useable frames, operation is changed. More specifically, so that reverse jog play may continue smoothly beyond the frames already stored in storage 109, it is necessary to obtain and store in storage 109 additional frames in the reverse direction.

To this end, switch 213 is switched to supply to I-frame encoder 107 the output of compressed video decoder 211. Compressed video decoder 211, like compressed video decoder 103, decodes a compressed video stream in the conventional manner to develop decompressed video frames which are supplied as an output. Additionally, a section of original compressed video bitstream which is prior to any frame stored in storage 109 is supplied to compressed video decoder 211. Preferably, the first frame of original compressed video bitstream so supplied is an I-frame.

Compressed video decoder 211 supplies the decompressed video frames it supplies as an output to I-frame encoder 107 via switch 213. I-frame encoder 107 encodes as I-frames the decompressed video frames from compressed video decoder 211 in the same manner as previously it had encoded decompressed video frames from compressed video decoder 103. The newly encoded I-frames are supplied by I-frame encoder 107 to storage 109, where they are stored in the same manner as for I-frames described above.

Advantageously, as the user jogs back beyond the first frame that was stored in storage 109 prior to the changing of position of switch 213 and activation of compressed video decoder 211, frames are available in storage 109 to be supplied to compressed video decoder 103, so as to achieve a smooth playback without delay. If the user continues to jog even further back, again when the video player only has left in storage 109 the certain number of useable frames additional portions of the original compressed bit stream may be obtained and processed as described above. Thus, by using this embodiment reverse jog play can easily display an essentially unlimited number of frames, which is a further improvement over the embodiment of FIG. 1.

The minimum number of frames that can remain in storage 101 prior to triggering the need to obtain additional frames to store in storage 109 so as to achieve a smooth playback without delay is a function of the particular hardware and software selected by the user. Of particular concern are a) the latency in accessing the necessary portion of original compressed video bitstream; b) the speeds of compressed video decoder 211, I-frame encoder 107 and storage 109; as well as c) how fast can the original compressed video bitstream be obtained. The faster frames can obtained, decoded, and reencoded, the less the number of frames that must remain in storage 109.

Note that although represented in FIG. 2 by two separate elements, there is no conceptual reason why compressed video decoder 103 and 211 could not be implemented by a single piece of hardware, e.g., a fast processor, that may, or may not, employ time sharing of some or all components.

Note that as used herein, inter-frame encoded frames may include portions of the frame that are intra-frame encoded. For example, see the Moving Pictures Expert Group (Cite), which is incorporated by reference as if fully set forth herein.

What is claimed is:

1. A video player, comprising:
   a first compressed video decoder to produce decompressed video frames from encoded frames in an original compressed video bitstream said first compressed video decoder being operable to decode intra-frame encoded frames and inter-frame encoded frames; and
   a memory for storing said versions of said decompressed video frames in intra-frame format, and for supplying said versions in a frame order that is the reverse of the frame order that would result from forward decoding of said original compressed video bit stream to said first compressed video decoder when said video player is operated using reverse jog play;
   wherein said first compressed video decoder also produces decompressed video frames from said versions of said decompressed video frames in intra-frame format which are supplied by said memory in said frame order that is the reverse of the frame order that would result from forward decoding of said original compressed video bit stream to said first compressed video decoder when said video player is operated using reverse jog play when said versions of said decompressed video frames in intra-frame format are supplied in lieu of said original compressed video bitstream.

2. The invention as defined in claim 1 further comprising an intra-frame encoder for encoding said decompressed video frames as said versions of said decompressed video frames in intra-frame format.

3. A video player, comprising:
   a first compressed video decoder to produce decompressed video frames from encoded frames in an original compressed video bitstream, said first compressed video decoder being operable to decode intra-frame encoded frames and inter-frame encoded frames; and
   a memory for storing said versions of said decompressed video frames in intra-frame format, and for supplying said versions of said decompressed video frames to said first compressed video decoder when said video player is operated using reverse jog play;
   wherein said video player is for playing to a user an original compressed video bitstream and said video player further comprises a switch For controllably supplying to said first compressed video decoder either said stored versions of said decompressed video signal or said original compressed video bitstream.

4. A video player, comprising:
   a first compressed video decoder to produce decompressed video frames from encoded frames in an original compressed video bitstream, said first compressed video decoder being operable to decode intra-frame encoded frames and inter-frame encoded frames;
   a memory for storing versions of decompressed video frames in intra-frame format, and for supplying said versions of said decompressed video frames to said first compressed video decoder when said video player is operated using reverse jog play; and
   a second compressed video decoder operable to decode intra-frame encoded frames and inter-frame encoded frames to produce decompressed video frames, said second compressed video decoder being coupled so as to be able to obtain intra-frame encoded frames and inter-frame encoded frames from said original compressed video bitstream which is also coupleable to said first compressed video decoder.

5. The invention as defined in claim 4 further comprising a switch coupled to said first compressed video decoder and to said second compressed video decoder.

6. The invention as defined in claim 4 further comprising a switch for controllably supplying as an output either said decompressed video frames from said first compressed video decoder or said decompressed video frames from said second compressed video decoder.

7. The invention as defined in claim 6 further including an intra-frame encoder for encoding said output of said switch as said versions of said decompressed video frames in intra-frame format.

8. The invention as defined in claim 1 wherein said versions of decompressed video frames in intra-frame format further includes at least one intra-frame encoded frame taken directly from said encoded frames in said original compressed video bitstream.

9. The invention as defined in claim 1 wherein said memory also stores at least one intra-frame encoded frame taken directly from said encoded frames in said original compressed video bitstream, and wherein said at least one intra-frame encoded frame taken directly from said encoded frames in said original compressed video bitstream is supplied, along with said versions of decompressed video frames in intra-frame format, to said first compressed video decoder when said video player is operated using reverse jog play.

10. The invention as defined in claim 1 wherein said versions of decompressed video frames in intra-frame format are written into said memory in a manner that overwrites empty portions of said memory.

11. The invention as defined in claim 1 wherein said versions of decompressed video frames in intra-frame format are written into said memory in a manner that overwrites a portion of said memory that stores an oldest frame, and then portions of said memory that store successive decreasingly older ones of said frames.

12. The invention as defined in claim 1 wherein said memory is arranged as a circular memory file for purposes of writing to said memory.

13. The invention as defined in claim 1 wherein said video player is one from the set consisting of: a digital video tape player, a digital video (versatile) disk (DVD), an internet video stream player, or a software Video player.

14. A video player, comprising:
   a first compressed video decoder for decoding intra-frame encoded frames and inter-frame encoded frames to produce decompressed video frames; and
   means for storing versions of said decompressed video frames in intra-frame format, and for supplying said versions of said decompressed video frames in a frame order that is the reverse of the frame order that would result from forward decoding of said intra-frame encoded frames and inter-frame encoded frames to said first compressed video decoder when said video player is operated using reverse jog play;

wherein said first compressed video decoder also produces decompressed video frames from said versions of said decompressed video frames in intra-frame format which are supplied by said means for storing in said frame order that is the reverse of the frame order that would result from forward decoding of said original compressed video bit stream to said first compressed video decoder when said video player is operated using reverse jog play when said versions of said decompressed video frames in intra-frame format are supplied to said first compressed video decoder when said video player is operated using reverse jog play.

15. The invention as defined in claim 14 wherein said means for storing and supplying is a memory.

16. The invention as defined in claim 14 wherein said means for storing and supplying stores additional decompressed video frames in intra-frame format after supplying a prescribed frame of said decompressed video frames in intra-frame format.

17. The invention as defined in claim 14 further comprising a second compressed video decoder for decoding intra-frame encoded frames and inter-frame encoded frames to produce decompressed video frames, and wherein said means for storing and supplying stores additional decompressed video frames in intra-frame format after supplying a prescribed frame of said decompressed video frames in intra-frame format, at least one of said additional decompressed video frames in intra-frame format being developed as a function of at least one video frame that is decompressed by said second compressed video decoder.

18. The invention as defined in claim 14 further comprising:
   a second compressed video decoder for decoding intra-frame encoded frames and inter-frame encoded frames to produce decompressed video frames; and
   an intra-frame encoder coupled to said means for storing and controllably s coupleable to said first compressed video decoder or said second compressed video decoder;
   wherein said means for storing and supplying stores additional decompressed video frames in intra-frame format after supplying a prescribed frame of said decompressed video frames in intra-frame format, at least one of said additional decompressed video frames in intra-frame format being developed by said second compressed video decoder and said intra-frame encoder.

19. A video player including at least a first compressed video decoder to produce decompressed video frames from encoded frames in an original compressed video bitstream, said first compressed video decoder being operable to decode at least inter-frame encoded frames, and a memory for storing representations of video frames recently decompressed by said first compressed video decoder, the video player being characterized in that said stored representations of video frames recently decompressed are encoded in an intra-frame format and said memory supplying said stored representations in a frame order that is the reverse of the frame order that would result from forward decoding of said original compressed video bit stream wherein said first compressed video decoder also produces decompressed video frames from said stored representations encoded in an intra-frame format which are supplied by said memory when said video player is operated using reverse jog play.

20. The invention as defined in claim 19 wherein said video player further includes an intra-frame encoder for encoding said stored representations of video frames recently decompressed into said intra-frame format.

21. The invention as defined in claim 19 wherein said video player further includes an intra-frame encoder for encoding said stored representations of video frames recently decompressed into said intra-frame format, and wherein intra-frame encoded video frames supplied to said first compressed video decoder bypass said intra-frame encoder and are supplied directly to said memory.

22. The invention as defined in claim 19 wherein said stored representations of video frames recently decompressed by said first compressed video decoder are decompressed by said first compressed video decoder in the course of operating said video player to achieve reverse jog play.

23. The invention as defined in claim 19 wherein said memory is also for storing intra-frame encoded video frames of said original compressed video bitstream and said stored intra-frame encoded video frames of said original compressed video which are stored in said memory are decompressed by said first compressed video decoder in the course of operating said video player achieve reverse jog play.

24. The invention as defined in claim 19 wherein said video player further includes:
   a second compressed video decoder to produce decompressed video frames from encoded frames in an original compressed video bitstream;
   an intra-frame encoder for encoding into said intra-frame format representations of video frames recently decompressed by a selected one of either said first compressed video decoder or said second compressed video decoder; and wherein
   said memory is also for storing representations of video frames recently decompressed by said second compressed video decoder; and
   representations of said recently decompressed video frames which are stored in said memory are decompressed by said first compressed video decoder in the course of operating said video player achieve reverse jog play.

25. The invention as defined in claim 19 wherein said video player further includes a second compressed video decoder to produce decompressed video frames from encoded frames in an original compressed video bitstream when a prescribed frame is played when said video decoder is operated to achieved reverse jog play, wherein said memory is also for storing representations of video frames recently decompressed by said second compressed video decoder, and representations of said recently decompressed video frames which are stored in said memory are decompressed by said first compressed video decoder in the course of operating said video player achieve reverse jog play.

26. A method for use in a digital video player which develops decompressed video frames from an original compressed video bitstream that includes at least inter-frame encoded frames, the method comprising the steps of:
   decompressing a plurality of frames of said original compressed video bitstream when said digital video player is not being operated in reverse jog mode;
   storing intra-frame encoded versions of.said decompressed plurality of frames in a memory; and
   supplying, from said memory to the same location to which said plurality of frames of said original compressed video bitstream is supplied so as to be decompressed in said decompressing step, said stored intra-frame encoded versions of said decompressed plurality of frames for reverse jog play in a frame order that is the reverse of the frame order that would result from forward decoding of said original compressed video bit stream; and decompressing a plurality of frames supplied from said memory to the same location to which said plurality of frames of said original compressed video bitstream is supplied when said digital video player is operated in reverse jog mode;

wherein said decompressing steps are performed by the same compressed video decoder regardless of whether said digital video player is operated in reverse jog mode or not.

27. The invention as defined in 26 where, in said supplying step, said intra-frame encoded versions of said decompressed plurality of frames are supplied in an order which is the reverse of an order in which said frames were stored in said storing step.

28. The invention as defined in 26 wherein said storing step includes the step of intra-frame encoding at least one of said decompressed frames to develop said intra-frame encoded versions.

29. The invention as defined in 26 wherein said storing step includes the step of intra-frame encoding at least one of said decompressed frames that was decompressed from an inter-frame encoded frame in said original compressed video bitstream.

30. The invention as defined in 26 wherein said storing step includes the step of storing at least one intra-frame encoded frame as said at least one intra-frame encoded frame existed within said original compressed video bitstream.

31. The invention as defined in 26 wherein said intra-frame encoded versions of said decompressed plurality of frames includes an intra-frame encoded version of at least one of said decompressed plurality of frames which was developed by decompressing an inter-frame encoded frame and then intra-frame encoding the resulting decompressed frame.

32. The invention as defined in 26 wherein each of said frames is stored in said storing step substantially contemporaneously with said frame being displayed.

33. The invention as defined in 26 wherein each of said frames is stored in said storing step substantially while a different frame is being displayed.

34. The invention as defined in 26 wherein additional frames are obtained and stored when said supplying step supplies an intra-frame encoded version of a specified one of said frames of said original compressed video bitstream.

35. A method for use in a digital video player which develops decompressed video frames from an original compressed video bitstream that includes at least one inter-frame encoded frame, the method comprising the steps of:

decompressing said at least one inter-frame encoded frame when said digital video player is not being operated in reverse jog mode;

storing in a memory an intra-frame encoded version of said decompressed at least one inter-frame encoded frame and at least an intra-frame encoded version of another frame; and supplying from said memory said stored intra-frame encoded version of said decompressed at least one inter-frame encoded frame and said intra-frame encoded version of said another frame for reverse jog play, in a frame order that is the reverse of the frame order that would result from forward decoding of said original compressed video bitstream, to the same location to which said at least one inter-frame encoded frame is supplied so as to be decompressed in said decompressing step; and decompressing at least said stored intra-frame encoded version of said decompressed at least one inter-frame encoded frame and said intra-frame encoded version of said another frame supplied from said memory to the same location to which said at least one inter-frame encoded frame is supplied when said digital video player is operated in reverse jog mode regardless of whether said digital video player is operated in reverse jog mode or not.

\* \* \* \* \*